United States Patent [19] [11] 4,039,207
Ishizuka [45] Aug. 2, 1977

[54] RECORDING SHEET

[75] Inventor: Akio Ishizuka, Fujimiya, Japan

[73] Assignee: Fuji Photo Film Co., Ltd., Minami-ashigara, Japan

[21] Appl. No.: 531,123

[22] Filed: Dec. 9, 1974

[30] Foreign Application Priority Data

Dec. 7, 1973 Japan ................................ 48-139235

[51] Int. Cl.$^2$ .......................... B32B 5/16; B41M 5/22

[52] U.S. Cl. .................................... 282/27.5; 428/306; 428/307; 428/341; 428/342; 428/323; 428/327; 428/402; 428/403; 428/537; 428/914; 428/913; 427/151; 427/152; 427/153

[58] Field of Search ....................... 427/150, 151, 152; 428/914, 307, 306, 341, 342, 402, 403, 407, 913, 323, 326, 327, 537; 282/27.5

[56] References Cited

U.S. PATENT DOCUMENTS

| | | | |
|---|---|---|---|
| 2,777,780 | 1/1957 | Cormack et al. | 427/151 |
| 3,364,052 | 1/1968 | Martino | 427/150 |
| 3,554,781 | 1/1971 | Matsukawa | 427/150 |
| 3,852,094 | 12/1974 | Yarian | 282/27.5 |
| 3,900,218 | 8/1975 | Miyamoto et al. | 282/27.5 |
| 3,931,430 | 1/1976 | Tada et al. | 427/150 |

*Primary Examiner*—Ellis Robinson
*Attorney, Agent, or Firm*—Sughrue, Rothwell, Mion, Zinn & Macpeak

[57] ABSTRACT

A recording sheet comprising a support having thereon a microcapsule layer containing a color former and wherein the support or microcapsule layer contains a desensitizing agent.

5 Claims, No Drawings

RECORDING SHEET

BACKGROUND OF THE INVENTION

1. Field of the Invention

The present invention relates to a recording sheet. More particularly, the present invention relates to a recording sheet which forms a color image when contacted with an acid.

2. Description of the Prior Art

A recording sheet utilizing the color forming reaction between an electron donating substantially colorless organic compound (hereinafter referred to as a "color former") and an electron attracting solid acid (hereinafter referred to as a "developer") has been known for a long time. Examples of such a recording sheet are, for example, the pressure sensitive copying paper as described in U.S. Pat. Nos. 2,505,470, 2,505,489, 2,550,471, 2,548,366, 2,712,507, 2,730,456, 2,730,457 2,972,547, etc., the heat sensitive copying paper as described in Japanese Patent Publication No. 4160/1968, U.S. Pat. No. 2,939,009, etc., and the recording member as described in German Patent Laid Open (OLS) No. 1,939,624.

These recording sheets will be explained by reference to a pressure sensitive copying paper. A pressure sensitive copying paper comprises an upper sheet produced by providing a microcapsule layer containing a color former on a support, an intermediate sheet produced by providing a microcapsule layer as described above on one side of a support and a developer layer on the other side of the support, and a lower sheet produced by providing a developer layer on a support. When the above sheets are arranged in such a manner that the microcapsule layer and the developer layer are contacted with each other and a pressure applied, the capsules are ruptured at the areas where the pressure is applied, and thus color is developed. In general, in these recording sheets, the developer layer is provided on the whole surface of the support and thus a desensitizing agent is print-coated on the areas of the sheet where recording is not necessary (as disclosed in U.S. Pat. No. 2,777,780).

However, these pressure sensitive copying papers have disadvantages in that undesired color images are formed. For example, when the microcapsules of the above described intermediate sheet are pressed, the color former solution contained in the capsules permeates through the support and diffuses into the developer layer provided on the opposite side of the support, and thus color-development results (permeation color-development). The desensitizing agent to be print-coated on the developer layer or color developer contains an organic solvent for dissolving a binder. Thus, when the developer layer at the areas where the desensitizer is not coated and the developer layer at the areas where the desensitizing agent is spot-printed are contacted with the microcapsule layer, the capsules are ruptured by the solvent and the color former is extracted from the capsules even though no pressure is applied, and thus color-development results (color fogging). Furthermore, although it is desired that the developer layer at the areas where the desensitizing agent is printed is not color-developed with the application of pressure and the like, the sizing agent and filler contained in the support react, as a matter of fact, with the color former, and thus color-development often occurs at these areas (color-development by the support).

Since the above described undesired color-development reduces the contrast, sharpness, resolving power, and the like of the copied image, the value of the pressure sensitive copying paper is reduced.

SUMMARY OF THE INVENTION

An object of the present invention is to provide a recording sheet which is free from undesired color-development.

Another object of the present invention is to provide a recording sheet capable of forming a color image which has excellent color density, contrast, sharpness, and resolving power.

These objects are attained by a recording sheet which comprises a support having thereon a microcapsule layer with the support or microcapsule layer containing a desensitizing agent.

DETAILED DESCRITPION OF THE INVENTION

The term "desensitizer" or "desensitizing agent" designates a substance which reduces or extinguishes the developing action of the developer. Although the mechanism by which desensitization is obtained is not clear, it is considered that the desensitization is based upon a neutralization of the acidity of the developer and/or a covering of the absorption of the developer. Many kinds of desensitizing agents have already been described in many patents and all of them can be used in the present invention. Of these desensitizing agents, those which are liquid and which are substantially non-volatile at ordinary temperature (about 20° to 30° C) are preferred, and the most preferred agent is a hydrophobic material containing no free amino group.

Representative examples of the desensitizing agents are as follows:

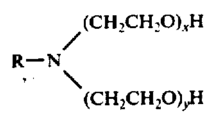

wherein R is a hydrocarbon group containing 12 to 18 carbon atoms (for example, an alkyl group, an aryl group), and x and y are integers, and $x + y$ is about 10 to 20;

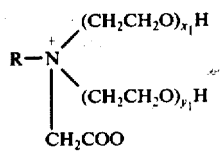

wherein R is a hydrocarbon group containing 12 to 18 carbon atoms (for example, an alkyl group such as a lauryl, palmityl, oleyl, stearyl, linoleyl, or myristyl group, or an aralkyl group such as a tolyl group), and $x_1$ and $y_1$ are integers and $x_1 + y_1$ is about 10 to 30;

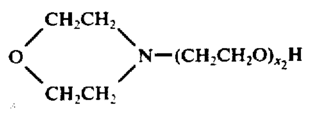

wherein $x_2$ is an integer of from about 10 to 30;

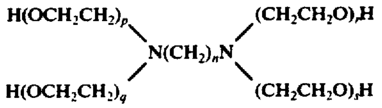

wherein *n* is an integer of from 2 to 6, and *p,q,r,* and *s* are integers and $p + q + r + s$ is about 10 to 60;

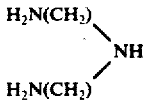 ;

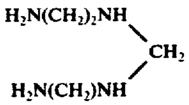 ;

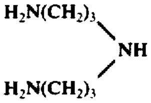 ;

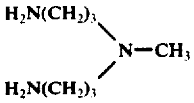 ;

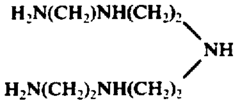 ;

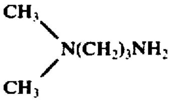 ;

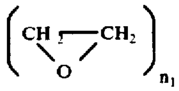

wjherein $n_1$ is an integer of from about 10 to 50;

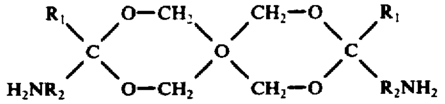

wherein $R_1$ is a hydrogen atom or an alkyl group, and $R_2$ and $R_3$ are straight chain or branched chain alkylene groups containing 1 to 6 carbon atoms;

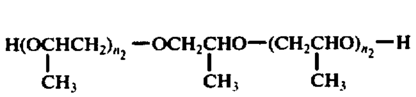

wherein $n_2$ is an integer of from about 1 to 30; and

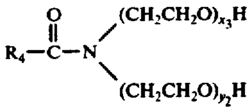

wherein $R_4$ is as described hereinbefore for R, and $x_3$ and $y_2$ are integers and $x_3 + y_2$ is about 50.

In addition, glycols such as ethylene glycol, propylene glycol, polyethylene glycol, and the like, fatty acids such as oleic acid, linolic acid, linolenic acid, and the like, dimers or trimers or unsaturated fatty acids such as those of linoleic acid, vegetable oils such as linseed oil, tung oil, soy bean oil, castor oil, and the like, polyamide resins having molecular weights of from about 3,000 to 10,000, etc., can be used. These desensitizers can be used individually or as mixtures of two or more desensitizers, as desired.

In general, one skilled in the art would consider that colored images could not be obtained in the presence of a desensitizer. However, it has been surprisingly found that in accordance with the present invention, color fogging can be prevented and furthermore no problems with respect to formation of the colored image are obtained and no problems with respect to a reduction in color density occur. Thus, in the present invention, it is important that the desenisitizer is present in the microcapsule layer containing the color former or the support.

In producing the recording sheet of the present invention, the microcapsule containing the color former is first prepared. The preparation of the microcapsule can be conducted using all hitherto known methods. The following color formers or mixtures thereof can be suitably employed:

triaryl methane compounds such as 3,3-bis(p-dimethylaminophenyl)-6-dimethylaminophthalide, i.e., Crystal Violet lactone, 3,3-bis(p-dimethylaminophenyl)phthalide, 3-(p-dimethylaminophenyl)-3-(1,2,-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis-(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-bis-(2-phenylindol-3-yl)-5-dimethylaminophthalide, 3p-dimethylaminophenyl-3-(1-methylpyrrol-2-yl)-6-dimethylaminophthalide, and the like; diphenyl methane compounds such as 4,4-bis-dimethylaminobenzhydrin benzyl ether, N-halophenyl-Leucoauramine, N-2,4,5-trichlorophenyl Leucoauramine, and the like; xanthene compounds such as Rhodamine B-anilinolactam, Rhodamine B-p-nitroanilinolactam, Rhodamine B-p-chloroanilinolactam, 7-dimethylamino-2-methoxyfluoran, 7-diethylamino-2-methoxyfluoran, 7-diethylamino-3-methoxyfluoran, 7-diethylamino-3-chlorofluoran, 7-diethylamino-3-chloro-2-methylfluoran, 7-diethylamino-2,2-dimethylfluoran, 7-diethylamino-3-acetylmethylaminofluoran, 7-diethylamino-3'-methylaminofluoran, 3,7-diethylaminofluoran, 7-diethylamino-3-dibenzylaminofluoran, 7-diethylamino-3-methylbenzylaminofluoran, 7-diethylamino-3-chloroethylmethylaminofluoran, 7-diethylamino-3-diethylaminofluoran, and the like; thiazine compounds such as benzoyl Leucomethylene Blue, p-nitrobenzyl Leucomethylene Blue, and the like; and spiro compounds such as 3-methyl-spiro-dinaphthopyran, 3,3-dichloro-spiro-dinaphthopyran, 3-benzylspiro-dinaphthopyran, 3-methyl-naphtho-(3-methoxy-benzo)-spiropyran, 3-propyl-spiro-dibenzopyran, and the like.

These color formers are dissolved in a solvent and as the solvent, natural or synthetic oils can be used alone or as a mixture with each other. Examples of suitable solvents are vegetable oils such as cotton seed oil, soybean oil, and linseed oil; petroleum fractions such as kerosene, naphtha, and paraffin oil; aliphatic synthetic oils such as chlorinated paraffin; aromatic synthetic oils such as chlorinated terphenyl, alkylated biphenyl, alkylated terphenyl, and alkylated naphthalene; and the like. A suitable color former concentration can range from about 1 to 50% by weight, preferably 1 to 10% by weight. The thus obtained solution is then encapsulated.

The formation of the microcapsules can be carried out, for example, using a coacervation method (as described in U.S. Pat. Nos. 2,800,457, 2,800,458, 3,041,289 and 3,687,865), an interfacial polymerization method (as described in U.S. Pat. Nos. 3,492,380 and 3,577,515, and British Pat. Nos. 950,443, 1,046,409 and 1,091,141), an internal polymerization method (as described in British Pat. No. 1,237,498 and French Pat. Nos. 2,060,818 and 2,090,862) or an external polymerization method (as described in British Pat. No. 989,264, and Japanese Patent Publication Nos. 12,380/1962, 14,321/1962, 29,483/1970, 7,313/1971 and 30,282/1971).

The thus prepared microcapsule coating liquid is generally a microcapsule dispersion, and thus it can be coated on a support as it is. Furthermore, with or without the separation of the microcapsules from the capsule dispersion liquid, binders such as latexes, e.g., styrene-butadiene-rubber latex and the like, and water-soluble polymer materials, e.g., starch, carboxymethyl cellulose, polyvinyl alcohol, gum arabic, casein, gelatin, and the like can be added. In addition, to the microcapsule coating liquid or the microcapsule layer, microcapsule protecting agents such as a fine powder of cellulose as described in U.S. Pat. No. 2,711,375, a fine powder of a polymer as described in U.S. Pat. No. 3,625;736, a fine powder of starch as described in British Pat. No. 1,232,347, and microcapsules without a color former as described in British Pat. No. 1,235,991 can be added. A suitable coating amount of the microcapsules ranges from about 1 to 20 $g/m^2$, preferably 3 to 10 $g/m^2$, of the support.

In introducing the desensitizing agent into the microcapsule layer, the densitizer is added to the microcapsule coating liquid produced as described above. The quantity of the desensitizer employed is about 5 $mg/m^2$ to 200 $mg/m^2$, and preferably 30 $mg/m^2$ to 100 $mg/m^2$, of the support.

The thus prepared microcapsule coating liquid is coated on a support such as a paper, a plastic film, a resin coated paper, or a synthetic paper. In this case, two or more microcapsule layers can be coated or layers other than the microcapsule layer can be coated, and it is sufficient to incorporate the desensitizer into at least one of these layers.

Where a paper is used as the support, the desensitizer can be added to the pulp during production of the paper or a solution containing the desensitizer can be coated on the paper produced by size-pressing. In this case, the quantity of the desensitizing agent added is the same as in the case of introducing the desensitizer into the microcapsule layer.

Developers which can be used in the present invention are also described in the above described patents. Typical examples are clays such as acid clay, activated clay, attapulgite, and the like; organic acids such as aromatic carboxy compounds, e.g., salicylic acid, aromatic hydroxy compounds, e.g., p-t-butylphenol, p-t-amylphenol, o-chlorophenol, m-chlorophenol and p-chlorophenol or the metal salts thereof, e.g., the zinc salt; acidic polymers such as phenol-formaldehyde resins and phenol-acetylene resins; and mixtures thereof, etc. Suitable developers are described in U.S. Pat. Nos. 3,501,331, 3,669,711, 3,427,180, 3,455,721, 3,516,845, 3,634,121, 3,672,935, 3,732,120, Japanese patent application Nos. 48545/1970, 49339/1970, 83651/1970, 84539/1970, 93245/1970, 93246/1970, 93247/1970, 94874/1970, 109872/1970, 112038/1970, 112039/1970, 112040/1970, 112753/1970, 112754/1970, 118978/1970, 118979/1970, 86950/1971, etc. The developers can be coated on a suitable support such as has been descrived for the microcapsule layer and a suitable coating amount of the color developer can range from about 1 to 8 $g/m^2$, preferably 2 to 6 $g/m^2$, of the support.

In accordance with the present invention, permeation color-development, color fogging, and color-development by the support can be prevented. Particularly, color fogging can be satisfactorily prevented even where a phenol resin, an aromatic carboxylic acid, or a metal salt thereof, e.g., the zinc salt, is used as the developer. These advantages lead to the prevention of undesired color-development which is occurs during production of the recording sheet or printing of the recording sheet. Furthermore, the production of the recording sheet having the above described advantages enables the properties of the color former, developer, or recording sheet, such as color density, water resistance, fastness to light, stability with time, copying ability, and the like, to be chosen as desired. Thus, the effect of the present invention is industrially quite significant.

The following examples are given to illustrate the invention in greater detail. Unless otherwise indicated, all parts, percents, ratios and the like are by weight.

EXAMPLE 1

100 Parts of the pulp was pulverized to 50 SR, and 5 parts of clay, 1.5 parts of rosin, 2 parts of aluminum sulfate, and 0.1 part of polyethylene gylcol (molecular weight 400) were added to produce a paper of 40 $g/m^2$. On the paper, the following microcapsule liquid was coated in an amount (solid content) of 6 $g/m^2$ to produce a color former sheet.

The microcapsule coating liquid was prepared as follows:

10 parts of an acid treated geletin having an isoelectric point of 8.0 and 10 parts of gum arabic were dissolved in 60 parts of water at 40° C, and 0.2 parts of sodium alkylbenzene sulfonate was added. In the resulting solution was emulsified 50 parts of a color former oil.

The color former oil was produced by dissolving 2.5 % by weight of Crystal Violet lactone and 2.0 % by weight of benzoyl Leucomethylene Blue in an oil comprising 4 parts of diisopropyl biphenyl and 1 part of kerosene.

When the size of the emulsion droplets became 8 microns on the average, 100 parts of water at 40° C was added to thereby stop the emulsification.

210 parts of water at 30° C was added while continuing the stirring and a 20 % hydrochloric acid aqueous solution was added to adjust the pH to 4.4. Furthermore, while continuing the stirring, the liquid was cooled to 8° C, and 1.5 parts of glutaraldehyde was added.

After 30 parts of a 10 % carboxymethyl starch aqueous solution was added and a 25 % sodium hydroxide aqueous solution was added dropwise to thereby adjust the pH to 8.5, the liquid was heated to 30° C, whereby microcapsules having hardened capsule walls were obtained. In the resulting liquid, 10 parts of cellulose floc was dispersed to thereby produce a coating liquid.

EXAMPLE 2

The procedure of Example 1 was repeated with the exception that polyethylene glycol was not added, whereby a paper of 40 $g/m^2$ was obtained. On the paper was coated a 15 % by weight aqueous solution of polyethylene glycol (molecular weight 600) in an amount of 40 $mg/m^2$. Furthermore, the microcapsules were coated in the same manner as in Example 1 and thus a color former sheet was obtained.

EXAMPLE 3

The procedure of Example 2 was repeated with the exception that 40 parts of dimer acid (a dimer of an unsaturated fatty acid having an iodine number of 100 to 110) was added to the capsule coating liquid, whereby a color former sheet was obtained.

EXAMPLE 4

A color former solution was prepared by adding 2 g of Crystal Violet lactone and 1 g of benzoyl Leucomethylene Blue to 30 g of propylnaphthalene. To the color former solution, 24 ml of a 2.5 % by weight solution of tolylenediisocyanatetrimethylol propane adduct (molar ratio 3:1) in ethyl acetate and 1 g of polyoxypropylene polyol (average molecular weight: 566; terminal OH=5.5) were added to prepare Liquid A. Then, 2 g of polyvinyl alcohol (average degree of polymerization: 550; degree of saponification: 88 %) and 2 g of carboxymethyl cellulose (degree of polymerization: 300; degree of etherification: 0.65) were added to 40 g of water to prepare Liquid B. Liquids A and B thus obtained were mixed, and 0.2 g of Turkey red oil was added and emulsified in the mixture. When the desired oil droplet size was obtained, the mixture was heated to 70° C and the stirring was continued for 3 hours, and thus microcapsules were obtained. Then, the liquid was cooled to a room temperature, and 5 g of cellulose floc and 0.1 g of oleic acid were added to thereby prepare a microcapsule liquid.

The thus obtained microcapsule coating liquid was coated in the same manner as in Example 2 on a paper of 40 $g/m^2$ in an amount (solid content) of 6 $g/m^2$, whereby a color former sheet was obtained.

On the surfaces opposite to the capsule layer of the color former sheets was obtained in Examples 1 through 4, the following developer was coated to thereby prepare intermediate sheets. The developer was produced by adding 1.6 parts of a 40 % sodium hydroxide queous solution and 20 parts of activated clay to 70 parts of water, adjusting the pH to 10.3, and then adding 8 parts of a styrene-butadiene rubber latex (solid content 48 %).

Test Procedure

On the color former sheets of Examples 1 through 4, a developer composition having the following composition was coated and the color density (at a wave length of 610 mμ) was measured (color fogging).

| | Parts |
|---|---|
| Cellulose Nitrate (degree of nitration 10.5 %) | 20 |
| Ethyl Acetate | 44 |
| Clay | 25 |
| Zinc Di-tert-butylsalicylate | 4 |
| Titanium Dioxide | 1 |
| Methyl Cellosolve | 6 |

Two sheets of each of the color former sheets as obtained in Examples 1 through 4 were placed together and a load of 600 $Kg/cm^2$ was applied. The color density (at a wave length of 610 μ) of the support was measured (color-development by the support). A load of 600 $Kg/cm^2$ was applied to the intermediate sheets of Examples 1 through 4, and the color density (at a wave length of 610 mμ) of the developer layer was measured (permeation color-development).

For comparison, the same test was conducted using the color former sheets containing no desensitizing agent in each of the Examples.

The results obtained are shown in Table 1.

Table 1

| Example | Desensitizer | Color Fogging | Color Development by Support | Permeation Color Development | Color Density: After 1 Day | Color Density: After 1 Day and UV Radiation for 2 Hours |
|---|---|---|---|---|---|---|
| 1 | — | 0.10 | 0.20 | 0.35 | 1.01 | 0.81 |
| | Polyethylene Glycol | 0.06 | 0.03 | 0.05 | 1.02 | 0.82 |
| 2 | — | 0.10 | 0.20 | 0.35 | 1.01 | 0.81 |
| | Polyethylene Glycol | 0.04 | 0.03 | 0.06 | 0.99 | 0.79 |
| 3 | — | 0.10 | 0.20 | 0.35 | 1.01 | 0.81 |
| | Dimer Acid | 0.04 | 0.04 | 0.05 | 1.00 | 0.80 |
| 4 | — | 0.09 | 0.20 | 0.30 | 0.85 | 0.64 |
| | Oleic Acid | 0.04 | 0.05 | 0.04 | 0.86 | 0.62 |

In Table 1, the color density was measured as follows. The color sheet and the intermediate sheet were placed together and a load of 600 $Kg/cm^2$ was applied to thereby form colored images. The thus obtained colored image was allowed to stand for one day and, alternatively, further exposed to ultraviolet light for 2 hours. Thereafter, the color density was measured.

Hitherto, it has been considered that the introduction of a desensitizing agent into a color former layer or the support reduces considerably the properties such as color density and the like. However, as shown by the results in Table 1, no difference in the color density and fastness to light (as a matter of fact, a density difference on the order of 0.02 to 0.03 in the density range of 0.5 or more cannot be observed by the naked eye), was observed in the addition of the desensitizing agent and remarkable effects in various undesired color-development can be obtained with the addition of the desensitizing agent. That is, where the desensitizing agent is not added, the density of color fogging, permeation color-development, and color-development by the support is 0.08 or more, which is recognized to be undesired color-development, whereas in Examples 1 to 4 of the present invention, the density is 0.08 or less in all cases.

Thus, it can be understood that undesired color-development is completely prevented (in the low density range, a density difference on the order of 0.02 to 0.03 can be sufficiently recognized).

While the invention has been described in detail and with reference to specific embodiments thereof, it will be apparent to one skilled in the art that various changes and modifications can be made therein without departing from the spirit and scope thereof.

What is claimed is:

1. A recording sheet comprising a support having thereon a microcapsule layer containing a color former wherein said sheet not containing a color developer wherein at least one of said support or said microcapsule layer contains a desensitizing agent, said agent being a liquid which is substantially nonvolatile at ordinary temperature selected from the group of compounds consisting of the compounds represented by the general formula (I)

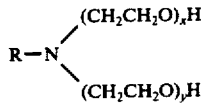

(I)

wherein R is a hydrocarbon group containing 12 to 18 carbon atoms, and $x$ and $y$ are integers, and $x + y$ is about 10 to 20; the compounds represented by general formula (II)

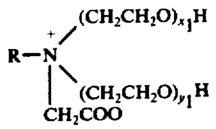

(II)

wherein R is a hydrocarbon group containing 12 to 18 carbon atoms, and $x_1$ and $y_1$ are integers and $x_1 + y_1$ is about 10 to 30; the compounds represented by general formula (III)

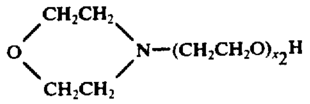

(III)

wherein $x_2$ is an integer of from about 10 to 30; the compounds represented by general formula (IV)

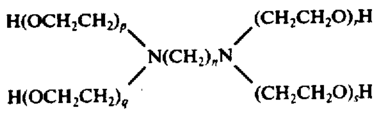

(IV)

wherein $n$ is an integer of from 2 to 6, and $p,q,r,$ and $s$ are integers and $p + q + r + s$ is about 10 to 60;

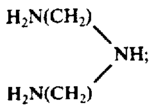

-continued

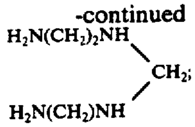

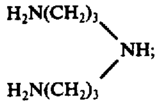

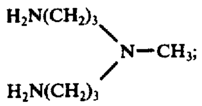

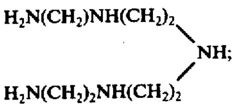

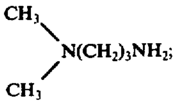

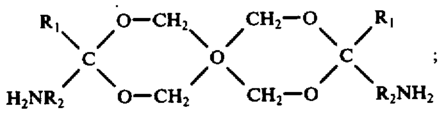

(V)

wherein $R_1$ is a hydrogen atom or an alkyl group, and $R_2$ and $R_3$ are straight chain or branched chain alkylene groups containing 1 to 6 carbon atoms; the compounds represented by general formula (VI)

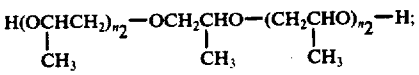

(VI)

wherein $n_2$ is an integer of from about 1 to 30; the compounds represented by general formula (VII)

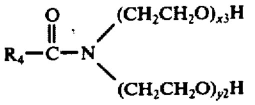

(VII)

wherein $R_4$ is a hydrocarbon having 12 to 18 carbon atoms, and $x_3$ and $y_2$ are integers and $x_3 + y_2$ is about 50; glycols; dimers or trimers of unsaturated fatty acids; polyamide resins having molecular weights of from about 3,000 to 10,000, and said agent being present in an amount of about 30 mg/m² to 100 mg/m² of the support.

2. The recording sheet according to claim 1, wherein the support is selected from the group consisting of a paper, a plastic film, a resin coated paper, and a synthetic paper.

3. The recording sheet according to claim 1, wherein the desensitizing agent is a hydrophobic material containing no free amino groups.

4. The recording sheet according to claim 1, wherein the desensitizer is selected from the group consisting of glycols, fatty acids, dimers of unsaturated fatty acids and trimers of unsaturated fatty acids.

5. The recording sheet according to claim 4, wherein the desensitizer is selected from the group consisting of polyethylene glycol, oleic acid, and linoleic acid.

* * * * *